United States Patent Office 2,759,930
Patented Aug. 21, 1956

2,759,930

CYCLOPENTANOPHENANTHRENE DERIVATIVES AND PROCESS

Franz Sondheimer and George Rosenkranz, Mexico City, Mexico, assignors to Syntex S. A., a corporation of Mexico No Drawing. Application November 24, 1954, Serial No. 471,121

Claims priority, application Mexico November 26, 1953

9 Claims. (Cl. 260—239.55)

The present invention relates to novel cyclopentanophenanthrene derivatives and to a novel process for the production thereof.

More particularly, the present invention relates to a novel androstane-6β,17β-diol-3-one, to esters thereof and to novel intermediate ketals. The novel final compounds of the present invention are novel androgenic hormones having especially useful anabolic effects together with relatively minor androgenic activity.

In accordance with the present invention it has been discovered that the novel compound androstane-6β,17β-diol-3-one and esters thereof may be prepared from the known compound androstane-3,6,17-trione by a new process involving selective formation of the 3-monoethyleneketal, followed by treatment of the ketal of the trione with a reducing agent to form the novel intermediate 3-monoethyleneketal of androstane-6β,17β-diol-3-one and the acid hydrolysis of this novel intermediate.

The process of the present invention may be illustrated by the following equation:

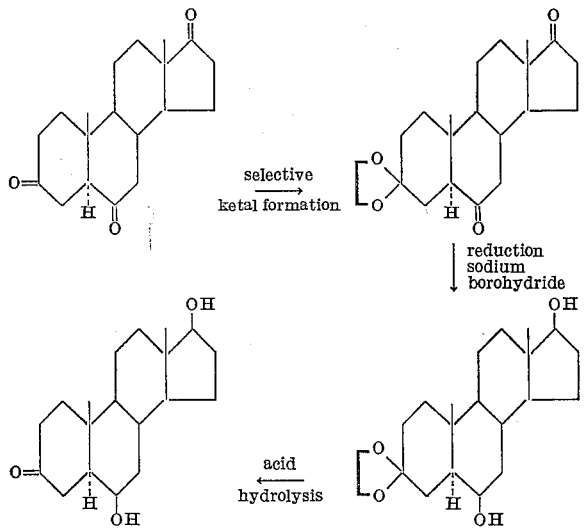

In practicing the process above outlined the 3-monoethylene ketal of androstane-3,16,17-trione was selectively produced by acid-catalyzed exchange reaction with a 1,3-dioxolane. Preferably the 1,3-dioxolane is 2,2-methyl ethyl-1,3-dioxolane and the acid catalyst was p-toluenesulphonic acid. For the reaction the androstanetrione was dissolved in an excess of methyl-ethyl-dioxolane and a catalytic amount of the p-toluenesulphonic acid added. The reaction mixture was then refluxed for a few minutes, i. e., of the order of 5 minutes and immediately cooled in an ice bath to crystallize the major part of the desired 3-monoethyleneketal. A further quantity of the desired product was obtained by chromatography of the mother liquor and by partial acid hydrolysis of the second mother liquor.

The 3-monoketal product of the first step was then reduced with reducing agent for steroid ketone groups preferably an alkali metal hydride such as sodium borohydride or lithium aluminum hydride to prepare the 3-monoethyleneketal of androstane-6β,17β-diol-3-one. This last compound was then hydrolized with an acid such as p-toluenesulphonic in an inert organic solvent, such as acetone solution.

The resultant novel compound androstane-6β,17β-diol-3-one was esterified to form the corresponding novel diesters using a conventional method for the esterification of steroid alcohols. In general there is thus formed by utilizing the appropriate acyl chloride or acid anhydride the diacylates of hydrocarbon carboxylic acids of less than about 10 carbon atoms including the diacylates of carbocyclic acids such as cyclopentyl propionic, aromatic acids such as benzoic or 4-nitrobenzoic, simple aliphatic acids such as acetic, propionic and butyric and dicarboxylic acids such as succinic which may form either the mono or diesters. As may be understood the acid grouping may be substituted, as for example, by nitro groups and/or halogen groups.

The following specific examples serve to illustrate but are not intended to limit the present invention:

Example I 25 g. of androstanetrione was dissolved in 300 cc. of methyl-ethyl-dioxolane and 1 g. of p-toluenesulphonic acid was added. The mixture was refluxed for 5 minutes and cooled in an ice bath, whereupon the monoethyleneketal crystallized directly to give 12.3 g., M. P. 216–220° C. The mother liquor was evaporated to dryness and chromatographed in a column with alumina, thus yielding 2.5 g. more of the monoketal. The second mother liquor which was an oily mixture of mono- and diketal was dissolved in 20 cc. of acetone, 500 mg. of p-toluenesulphonic acid was added and the mixture was kept overnight, whereupon an additional 4.4 g. of the 3-monoketal crystallized out, M. P. 214–216°, thus raising the total yield to 19 g.

Example II 15 g. of sodium borohydride was added to a solution of 15 g. of the 3-monoethyleneketal of androstanetrione in 650 cc. of ethanol and the mixture was kept overnight at room temperature. Acetic acid was added dropwise to decompose the excess of reagent, the solution was concentrated under vacuum to one fourth of its initial volume, water was added and the precipitate was filtered and washed to neutral, thus yielding 14.7 g. of the crude ketal of androstanediolone. After recrystallization from acetone-ether the pure ketal, i. e., the monoethyleneketal of androstane-6β,17β-diol-3-one had a M. P. of 192–195° C.

14.5 g. of the crude ketal was dissolved in 200 cc. of acetone and 1.4 g. of p-toluenesulphonic acid was added to the solution which was kept standing overnight at room temperature. After pouring into water, the precipitate was filtered and recrystallized from methanol, thus giving 6.5 g. of androstane-6β,17β-diol-3-one. After one recrystallization from methanol, the M. P. was 242–244° C.

300 mg. of androstane-6β,17β-diol-3-one was dissolved in a mixture of 1.5 cc. of anhydrous pyridine and 1.5 cc. of acetic anhydride. The mixture was heated for 1 hour on the steam bath, poured into water and the precipitate was filtered and washed to neutral. Recrystallization from methanol afforded the diacetate of androstane-6β,17β-diol-3-one with M. P. 128–130° C.

Other diesters of androstane-6β,17β-diol-3-one are prepared by reacting androstane-6β,17β-diol-3-one with acid anhydrides according to the above described acylation procedure or by conventionally utilizing the corresponding acyl halides. These esters include esters of hydrocarbon carboxylic acids of less than 10 carbon atoms derived from saturated or unsaturated, aliphatic, carbocyclic, or cycloaliphatic, aryl, arylalkyl, alkaryl, mono, di or polycarboxylic acids which form ester groups such as for example formyloxy, propionoxy, dimethyl-acetoxy, trimethylacetoxy, butyryloxy, valeryloxy, benzoxy, phenylacetoxy, toluoloxy, cyclopentylformoxy, acryloxy and the esters of dicarboxylic acids such as succinic, glutaric and adipic.

We claim:

1. A method for the preparation of androstane-6$\beta$,17$\beta$-diol-3-one which comprises selectively forming the 3-monoethyleneketal of androstane-3,6,17-trione, treating the 3-ketal with a reducing agent to form the 3-monoethylene ketal of androstane-6$\beta$,17$\beta$-diol-3-one and hydrolizing the last mentioned ketal with a dilute acid.

2. The method of claim 1 wherein the 3-monoethyleneketal is formed by an exchange reaction with methylethyl-dioxolane in the presence of an acid catalyst and with a reaction time of the order of five minutes.

3. The method of claim 1 wherein the reducing agent is sodium borohydride.

4. The method of claim 1 wherein the dilute acid is p-toluenesulphonic acid and the hydrolysis takes place is acetone solution.

5. The method of claim 2 wherein the reducing agent is sodium borohydride.

6. A new compound selected from the class consisting of androstane-6$\beta$,17$\beta$-diol-3-one and its hydrocarbon carboxylic acid esters of less than 10 carbon atoms.

7. Androstane-6$\beta$,17$\beta$-diol-3-one.

8. The diacetate of androstane-6$\beta$,17$\beta$-diol-3-one.

9. The 3-monoethyleneketal of androstane-6$\beta$,17$\beta$-diol-3-one.

References Cited in the file of this patent

UNITED STATES PATENTS

| | | |
|---|---|---|
| 2,356,154 | Fernholz | Aug. 22, 1944 |
| 2,378,918 | Fernholz | June 26, 1945 |
| 2,671,095 | Levin | Mar. 2, 1954 |
| 2,683,725 | Murray | July 13, 1954 |
| 2,692,273 | Murray | Oct. 19, 1954 |

OTHER REFERENCES

Ehrenstein: 2nd long internal biochem Symposium biochem des steroids, Paris (1952), pp. 13–14, abstracted in C. A., vol. 47 (1953), p. 9337.